United States Patent [19]
Cahuzac et al.

[11] Patent Number: 6,045,729
[45] Date of Patent: Apr. 4, 2000

[54] METHOD OF MANUFACTURING A FIBROUS STRUCTURE FOR A COMPOSITE FIBER-MATRIX MATERIAL PART

[75] Inventors: Georges Jean Joseph Antoine Cahuzac, Le Bouscat; Patrick Georges Jacques DeCraecker, Arsac, both of France

[73] Assignee: Aerospatiale Societe Nationale Industrielle, Paris, France

[21] Appl. No.: 09/126,757

[22] Filed: Jul. 31, 1998

[30]    Foreign Application Priority Data

Sep. 4, 1997 [FR] France ................................. 97 10995

[51] Int. Cl.⁷ .................................................. B29C 35/16
[52] U.S. Cl. ............................ 264/28; 264/162; 264/163; 112/440
[58] Field of Search ............................ 264/28, 162, 163; 112/440, 441

[56]    References Cited

U.S. PATENT DOCUMENTS 3,921,874  11/1975  Spain ............................................ 225/4
4,681,151   7/1987  Koya et al. .................................. 164/76.1
5,429,853   7/1995  Darrieux .
5,460,673  10/1995  Cahuzac ........................................ 156/93

FOREIGN PATENT DOCUMENTS 0 556 088   8/1993  European Pat. Off. .
59-2833     1/1984  Japan .
63-5892     1/1988  Japan .
4-193507    7/1992  Japan .

OTHER PUBLICATIONS

Patent Abstracts of Japan, vol. 012, N. 201 (M–707), [and JP 63 005892A].

Database WP1, Section Ch, Week 9234, Doc. Publ. Ltd., London, Class A 32, AN 92–281482, XP002067023 and JP 04 193 507 A.

*Primary Examiner*—Jan H. Silbaugh
*Assistant Examiner*—Stefan Staicovici
*Attorney, Agent, or Firm*—Fisher, Christen & Sabol

[57]                ABSTRACT

The manufacture of a fibrous structure (1) for a composite material part. At least one portion (3) of the fibrous structure (1) is obtained by at least partial machining of a fibrous blank stiffened by freezing a liquid impregnating the blank.

5 Claims, 2 Drawing Sheets

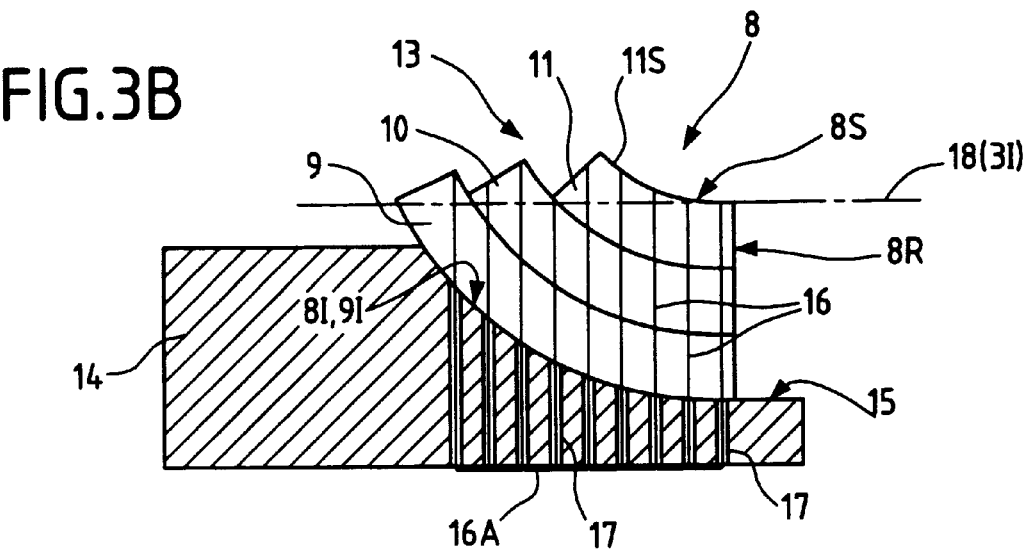
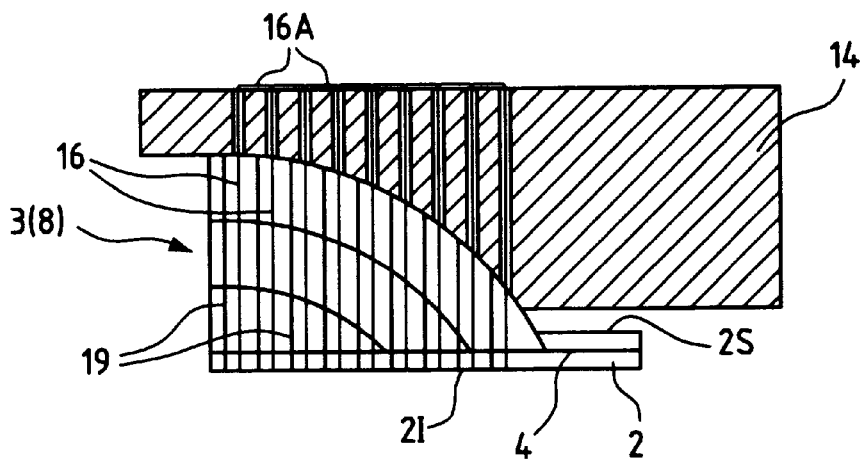
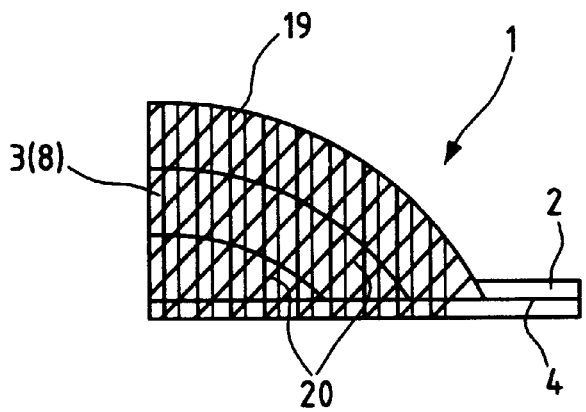

METHOD OF MANUFACTURING A FIBROUS STRUCTURE FOR A COMPOSITE FIBER-MATRIX MATERIAL PART

The present invention concerns a method of manufacturing a fibrous structure for a composite fiber-matrix material part and the fibrous structure manufactured using this method.

A known composite material part comprises a fibrous structure buried in a hardened matrix. As a result the shape of the fibrous structure is therefore related directly to the required shape of said composite material part. Also, if the latter has a complex shape, it is difficult—and sometimes impossible—to impart to the fibrous structure the optimal shape for the composite material part to be obtained, all the more so in that said fibrous structure is naturally flexible.

The aim of present invention is to remedy this drawback and to enable the manufacture of fibrous structures for composite material parts having complex shapes.

To this end, in accordance with the invention, in the method of manufacturing a fibrous structure for a composite fiber-matrix material part:

a) a fibrous, flexible and porous blank of a fibrous part representing at least a part of said fibrous structure is made, b) said porous blank is impregnated with a freezeable liquid;

c) said blank impregnated in this way with freezeable liquid is cooled to freeze said freezeable liquid impregnating said blank and consequently to stiffen said blank;

d) said blank stiffened in this way is machined at least partly to the required shape for said fibrous part; and e) after thawing said liquid impregnating said machined blank, said liquid is eliminated to obtain said fibrous part.

Because in accordance with the present invention said blank is stiffened by the frozen liquid impregnating it, the blank can therefore be machined, for example milled, turned, routed, filed, drilled, etc to obtain a fibrous part of complex shape.

A blank of the above kind can consist of a piece of felt, a piece of woven fabric, a piece of braid, a piece made up of interlaced threads, a piece made up by depositing fibrous strips or threads, etc or an assembly of such pieces. The principal feature of this blank is that it must be porous so that it can be impregnated with a quantity of freezeable liquid appropriate to stiffening and machining the blank.

In a first embodiment of the method in accordance with the present invention, said fibrous part obtained by machining the blank represents all of said fibrous structure. In this case, to obtain said composite material part, it is therefore sufficient to carry out the usual operations known in themselves of impregnating said fibrous part with the material of the matrix and then hardening the latter.

On the other hand, in a second embodiment of the method of the invention, said fibrous part obtained by machining the blank can represent only a part of said total fibrous structure of the composite material part. In this case, to obtain said fibrous structure, it is necessary to attach said machined fibrous part to at least one additional fibrous part. The additional fibrous part or parts can themselves be obtained by machining a blank in accordance with the present invention or by any other means.

The second embodiment of the method of the invention therefore enables the manufacture of the complex shape parts of the fibrous structure by machining and the simple shape parts of said structure by any other known means, for example weaving, braiding, stitching, etc. Moreover, by providing a plurality of fibrous parts, it enables the directions of the fibers in each of said fibrous parts constituting the fibrous structure to be optimized to confer appropriate mechanical properties on it.

To limit the area of the surfaces of said blank to be machined and to restrict machining to the surfaces of said blank that must have the most complex shapes, prior to operation c) during which the liquid impregnating the blank is frozen, said blank is preferably placed in an open mold, the imprint of which corresponds at least approximately to a part of the exterior shape of said fibrous part, and fastened to said mold, after which the series of operations c) through e) is carried out, the machining operation applying only to the part of said blank accessible from the open side of the mold.

When, as mentioned above, the fibrous structure includes, in addition to said machined fibrous part, at least one additional fibrous part, it is advantageous for the surface by which said machined fibrous part is attached to an additional fibrous part to be machined during operation d) described above. Then not only can said fibrous part adapt optimally to the shape of said additional fibrous part but also said machined part is inside said fibrous structure.

When the fibrous blank is machined when it is retained in a mold, as described above, the machined fibrous part obtained by machining said blank preferably remains attached to said mold during the operation of attaching said machined fibrous part to at least one additional fibrous part. Accordingly, during this attachment operation, said machined fibrous part is kept to the shape of the mold, which aids the execution of this operation and the accuracy of the shape of the fibrous structure.

To assure this accuracy of shape, the imprint of the mold must in theory have a shape identical to that of the outside surface of the corresponding portion of the machined fibrous part. However, in some cases, the imprint of the mold can be slightly different in shape to said outside surface, the exact shape being imparted to said outside surface by fitting of the machined fibrous part to said additional fibrous part, by virtue of the flexibility of said machined fibrous part, when attaching said fibrous parts together. Because of this approximation of the shape of the mold imprint, it is sometimes possible to simplify the machining operation d) by simplifying the shape of the machined surface.

Said machined fibrous part is preferably attached to said additional fibrous part and said blank is preferably attached to said mold by stitching or like means. However, the blank can be attached to the mold using pins or the like attached to said mold and penetrating said blank, while the machined fibrous part can be attached to the additional fibrous part using pegs.

It goes without saying that the present invention also concerns fibrous structures comprising either a single machined fibrous part or an assembly of one or more machined fibrous parts with additional fibrous parts in which the machined part or parts are obtained using the method described hereinabove.

The figures of the appended drawings will explain clearly how the invention can be put into effect. In these figures, identical reference numbers designate similar items.

FIGS. 3A, 3B and 3C are schematic illustrations of the use of the method in accordance with the present invention to obtain a second fibrous part for making the structure from FIG. 1.

FIG. 4 illustrates schematically the attachment of said first and second fibrous parts together to obtain the fibrous structure from FIG. 1.

Figure 1:
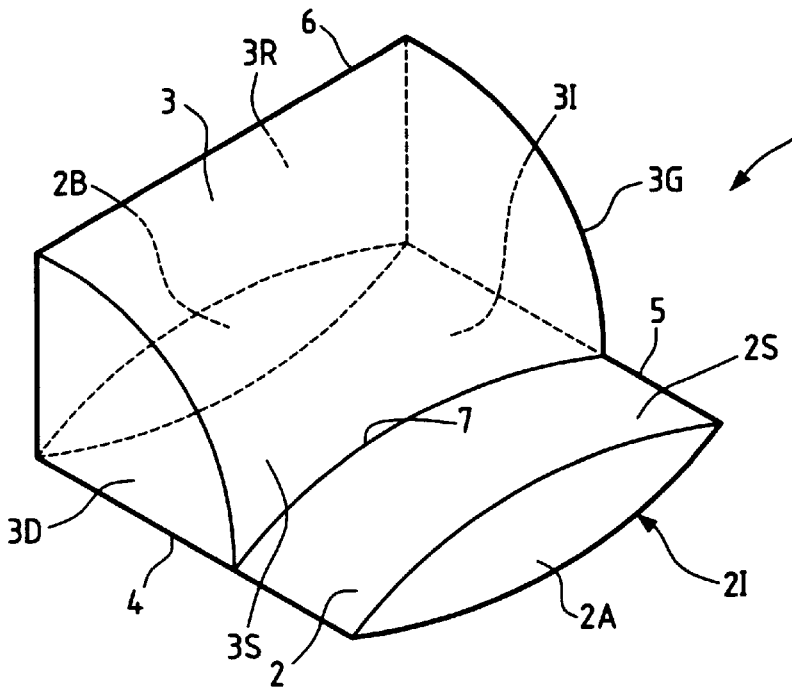
FIG. 1 shows in perspective one example of a fibrous structure that can be manufactured using the method of the present invention.

To illustrate the method in accordance with the present invention, we have chosen to describe hereinafter the manufacture of the fibrous structure 1 shown in FIG. 1.

Figure 2:
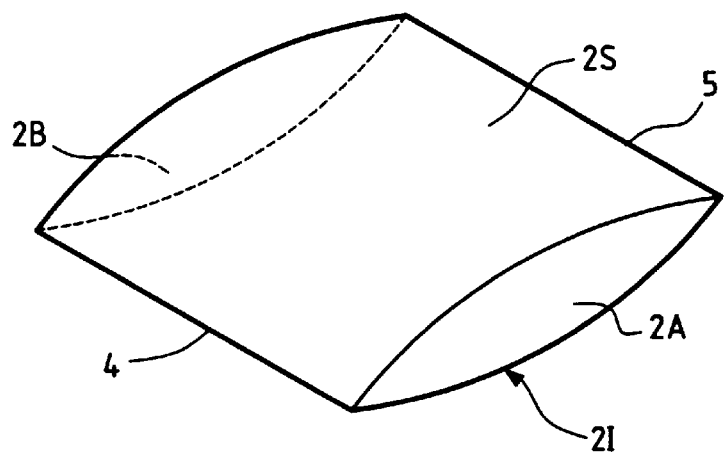
FIG. 2 shows in perspective a first fibrous part for making the structure from FIG. 1.

This fibrous structure 1 includes a flat fibrous member 2 (see also FIG. 2) carrying a fibrous bead 3 at one end.

Said flat fibrous member 2 is delimited by two end sections 2A and 2B and by a domed upper surface 2S and a domed lower surface 2I joining together at two lateral lines 4 and 5. It can be made by weaving, in a manner known in itself. This weaving comprises a plurality of superposed levels of weft threads and warp threads passing around weft threads at different levels.

The fibrous bead 3 extends the full width of the flat fibrous member 2 and is delimited by:

two lateral end faces 3G and 3D;

a rear face 3R vertically aligned with the end face 2B of the member 2 and projecting relative to upper surface 2S of the latter;

a domed upper face 3S dropping down from the upper edge 6 of the rear face 3R to the upper face 2S of the member 2, which it intersects along the curved intersection line 7; and a lower face 3I containing said line 7 and having a shape complementary to that of the upper surface 2S of the member 2, in order to fit to the latter.

Thus the bead 3 has the general shape of a curvilinear triangular prism.

Figure 3A:
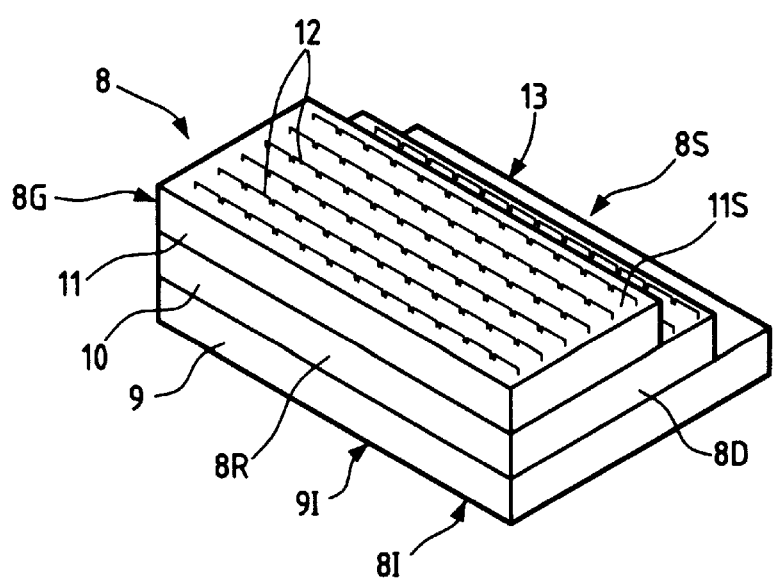

To obtain the bead 3, the first step is to manufacture a fibrous, flexible and porous blank 8. In the FIG. 3A embodiment this blank 8 consists of a stacked plurality of layers 9, 10, 11 joined together by rows of stitches 12. All the layers 9, 10, 11 have the same length which corresponds to that of the bead 3 and they are aligned laterally and longitudinally to define two lateral end faces 8G and 8D (corresponding to the lateral end faces 3G and 3D of the bead 3) and a rear face 8R (corresponding to the rear face 3R of the bead 3) of the blank 8.

On the other hand the width of the layers 9, 10, 11 decreases from the lower layer 9 to the upper layer 11 with the result that the upper face 8S of the blank 8 is formed by the plane upper face 11S of the layer 11 and by steps 13 opposite the rear face 8R. The lower face 8I of the blank 8 is formed by the plane lower face 9I of the layer 9.

Each layer 9, 10, 11 is flexible, fibrous and porous. It consist of a woven structure, for example, of a type similar to that of the fibrous member 2.

As shown in FIG. 3B, the blank 8 is fitted to a rigid open mold 14 the imprint 15 of which has the shape of the domed upper face 3S of the bead 3. The lower face 8I of the blank 8 is pressed against the imprint 15 and deforms to conform to said imprint 15 by virtue of the flexibility of the blank 8. Moreover, said blank is attached to the mold 14, for example by stitches 16 passing through passages 17 provided for this purpose in said mold 14. Such attachment could equally be obtained by spikes or pins (not shown) attached to said mold 14 and penetrating said blank 8. After fixing the deformed upper face 8S of the blank 8, i.e. the upper face 11S and the steps 13, is outside the imprint 15.

The porous blank 8, attached in this way to the mold 14, is then impregnated with a liquid that can be frozen, for example water, so that this liquid penetrates the pores of the blank 8, after which the impregnated blank 8 and the mold 14 attached to the blank 8 are cooled sufficiently to freeze the impregnation liquid and consequently to stiffen said blank. This operation of stiffening the blank 8 can be carried out in a freezer (not shown).

After appropriate freezing and stiffening, the combination of the blank 8 and the mold 14 is removed from said freezer and the blank 8 is machined to impart to the upper face 8S of the blank 8 the shape of the lower face 3I of the bead 3, i.e. the shape complementary to that of the upper face 2S of the member 2. In FIG. 3B the milling operation is symbolized by the chain-dotted line 18.

After machining the upper face 3I, the blank 8 has become the bead 3 and the combination of the bead 3 and the mold 14 is heated (actively or by allowing it to warm up to room temperature naturally) and the thawed impregnation liquid is eliminated.

As shown in FIG. 3C, the lower face 3I of the bead 3, which is held in shape by the mold 14 to which it continues to be attached, is pressed onto the appropriate location on the upper face 2S of the member 2 and attached to the latter by stitches 19, for example effected from the face 2I of the member 2. This attachment could equally be obtained by means of pegs (not shown) inserted in the passages 17.

After this attachment, the fibrous structure 1 is obtained which can then be separated from the mold 14 by cutting portions 16A of the threads 16 outside the latter (see FIG. 4).

Thus in the bead 3 made by the procedure described above:

the lateral end faces 3G and 3D and the rear face 3R are respectively obtained from the corresponding faces 8G, 8D and 8R of the blank 8;

the upper face 3S is obtained from the lower face 8I (9I) shaped by the mold 14; and the lower face 3I is obtained by machining.

Of course, the fibrous structure 1 of the FIG. 4 can then undergo any appropriate complementary operation for manufacturing the corresponding composite part. It can equally be reinforced with additional stitches 20.

In the foregoing description, it was stated that the shape of the imprint 15 of the mold 14 corresponded exactly to that of the upper face 3S and that the machining 18 conferred on the upper face 8S the exact shape of the lower face 3I.

Nevertheless it may be advantageous to exploit the flexibility of the bead 3 manufactured from the blank 8 to simplify the machining 18.

For example, it is advantageous for the domed face 3I to be obtained by plane machining rather than concave (or convex) machining. To this end:

the imprint 15 can have a shape slightly different from that of the upper face 3S so that a bead 3' is obtained having an upper face 3S' different from the exact upper face 3S;

the upper face 8S can have, by virtue of the machining 18, a plane shape 3I' which is therefore different from the curved shape 3I, provided that, by virtue of the flexibility of the bead 3' obtained in this way, the bead 3' deforms when its plane face 3I' is pressed onto the upper face 2S and is caused to deform in order to mate perfectly with the latter, so that the upper face 3S' assumes, by deformation, the exact shape of the upper face 3S.

What is claimed is:

1. A method of manufacturing a fibrous structure (1) for a composite fiber-matrix material part, comprising:

(a) providing a fibrous, flexible and porous blank (8) of a fibrous part (3) representing a part of said fibrous structure (1);

(b) placing said porous blank (8) in an open mold (14), the shape of the imprint of which corresponds at least approximately to the outside surface (35) of a part of said fibrous part (3) and said blank (8) is attached to said mold (14), and then impregnating said blank (8) with a freezeable liquid;

(c) cooling said blank (8) impregnated in this way with freezeable liquid to freeze said freezeable liquid impregnating said blank and consequently to stiffen said blank;

(d) machining (at 18) said blank (8) stiffened in this way at least partly to the required shape for said fibrous part (3);

(e) after thawing said liquid impregnating said machined blank, eliminating said liquid to obtain said fibrous part; and (f) attaching said machined fibrous part (3), remaining attached to said fibrous mold (14), to at least one additional fibrous part (2) to form said fibrous structure (1).

2. The method according to claim 1, wherein a surface (31) of said machined fibrous part (3) which is attached to an additional fibrous part (2) is machined during operation (d).

3. The method according to claim 1, wherein the imprint (15) of said mold is shaped to simplify the machining operation (d) and so that said machined fibrous part has said appropriate external shape, by virtue of its flexibility, when its attachment surface is pressed against the additional fibrous part or parts.

4. The method according to claim 1, wherein said machined fibrous part (3) is attached to said additional fibrous part (2) by stitching means.

5. The method according to claim 1, wherein said blank (8) is attached to said mold (14) by stitching means.

* * * * *